US006843377B1

(12) United States Patent
Roll

(10) Patent No.: US 6,843,377 B1
(45) Date of Patent: Jan. 18, 2005

(54) SPACER AND FILTER ASSEMBLY UTILIZING THE SPACER

(75) Inventor: Mark Allen Roll, Bessemer City, NC (US)

(73) Assignee: Dana Corporation, Toledo, OH (US)

( * ) Notice: Subject to any disclaimer, the term of this patent is extended or adjusted under 35 U.S.C. 154(b) by 167 days.

(21) Appl. No.: 10/160,069

(22) Filed: Jun. 4, 2002

(51) Int. Cl.[7] .............................................. B01D 27/08
(52) U.S. Cl. ....................... 210/437; 210/454; 210/456; 210/497.01
(58) Field of Search ................................ 210/435–437, 210/450–451, 454–455, 447, 418, 497.01, DIG. 13, 232, DIG. 17, 456, 405; 55/456

(56) References Cited

U.S. PATENT DOCUMENTS

| | | | |
|---|---|---|---|
| 3,078,650 A | | 2/1963 | Anderson et al. |
| 3,132,097 A | | 5/1964 | Tietz |
| 3,232,437 A | | 2/1966 | Hultgren |
| 3,332,554 A | * | 7/1967 | Humbert, Jr. ............... 210/130 |
| 3,508,383 A | | 4/1970 | Humbert, Jr. et al. |
| 3,637,078 A | | 1/1972 | Hollar |
| 3,767,054 A | * | 10/1973 | Farrow et al. .............. 210/232 |
| 4,052,307 A | * | 10/1977 | Humbert, Jr. ............... 210/130 |
| 4,141,700 A | * | 2/1979 | Norton et al. ................ 55/337 |
| 4,541,628 A | | 9/1985 | Parviainen |
| 4,622,136 A | | 11/1986 | Karcey |
| 4,738,776 A | | 4/1988 | Brown |
| 4,740,299 A | | 4/1988 | Popoff et al. |
| 4,832,844 A | | 5/1989 | Ayers |
| 4,839,037 A | | 6/1989 | Bertelsen et al. |
| 4,855,047 A | | 8/1989 | Firth |
| 4,992,166 A | | 2/1991 | Lowsky et al. |
| 5,082,561 A | | 1/1992 | LaPierre |
| 5,104,537 A | | 4/1992 | Stifelman et al. |
| 5,118,417 A | | 6/1992 | Deibel |
| 5,171,430 A | | 12/1992 | Beach et al. |
| 5,256,285 A | | 10/1993 | Tomita et al. |
| 5,300,223 A | | 4/1994 | Wright |
| 5,302,284 A | | 4/1994 | Zeiner et al. |
| 5,342,511 A | | 8/1994 | Brown et al. |
| 5,342,519 A | | 8/1994 | Friedmann et al. |
| 5,362,390 A | | 11/1994 | Widenhoefer et al. |
| 5,390,701 A | | 2/1995 | Lessley et al. |
| 5,395,518 A | | 3/1995 | Gulsvig |
| 5,445,734 A | | 8/1995 | Chen |
| 5,489,384 A | | 2/1996 | Janik et al. |
| 5,490,930 A | | 2/1996 | Krull |
| 5,525,226 A | | 6/1996 | Brown et al. |
| 5,548,893 A | | 8/1996 | Koelfgen |
| 5,695,637 A | | 12/1997 | Jiang et al. |
| 5,785,850 A | | 7/1998 | Lynch et al. |
| 5,985,144 A | * | 11/1999 | Janik et al. ................. 210/233 |
| 6,073,937 A | | 6/2000 | Stevens et al. |
| 6,143,046 A | | 11/2000 | Wiegand et al. |
| 6,322,697 B1 | | 11/2001 | Hacker et al. |
| 6,350,379 B1 | * | 2/2002 | Roll et al. ................ 210/323.2 |
| 6,423,225 B2 | * | 7/2002 | Wong et al. ................ 210/304 |
| D475,129 S | * | 5/2003 | Ward et al. ................. D23/365 |

FOREIGN PATENT DOCUMENTS

FR          1165203          10/1958

\* cited by examiner

*Primary Examiner*—Terry K. Cecil
(74) *Attorney, Agent, or Firm*—Millen, White, Zelano & Branigan, P.C.

(57) ABSTRACT

An end cap of a filter element has canted fins in an annular space between a filter element and filter housing for imparting a rotary motion to a fluid prior to the fluid passing through the filter element. The end cap includes a plurality of axially extending legs upstream of the fins, which legs engage a nutplate. Spaces between the legs provide an inlet allowing dirty fluid to flow to the outside surfaces of the filter element. The fins remove large particles from the fluid by centrifugal force so that large particles do not add to the contaminant load in the filter elements.

15 Claims, 4 Drawing Sheets

SPACER AND FILTER ASSEMBLY UTILIZING THE SPACER

FIELD OF THE INVENTION

The present invention is directed to a spacer element and a filter assembly utilizing the spacer element. More particularly, the present invention is directed to a spacer element and a filter assembly utilizing the spacer element wherein the spacer element is used in filter assemblies in which liquid to be filtered is given a cyclonic path around at least one annular filter element before passing through the filter media of the filter element in order to remove contaminants.

BACKGROUND OF THE INVENTION

Filter cartridges used for filtering fluids such as lubricating oil can be arranged with a full flow filter element and a bypass filter element, the bypass filter element being stacked on the full flow filter element with the fluid flowing radially through the filter elements into hollow cores thereof and then axially out of the cartridges.

This arrangement is widely employed to filter lubricating oil used in internal combustion engines. Engine wear, specifically piston ring wear, is directly related to the amount of actual filtration of lubricating oil by both full flow and bypass filters which is mixed after filtration. It has been found that by combining filtration provided by a full flow filter element with that of a bypass filter element substantially reduces engine wear as compared to using only full flow filtration. Moreover, by using a combination of full flow and bypass flow lubricating oil, service intervals can be increased so that maintenance expense is reduced. Maintenance expense is a major consideration in the total expense of operating a vehicle. This is, of course, is a major concern for fleets of vehicles, such as the fleets operated by trucking companies. In addition, by keeping lubricating oil clean, it can remain in engines longer and does not have to be recycled at shorter intervals. Consequently, environmental concerns due to vast amounts of used lubricating oil are reduced because less used oil must be recycled. It is therefore beneficial to enhance the performance of lubricating oil cartridges which utilize both full flow filter elements and bypass filter elements.

Arrangements have evolved wherein filter mounting bases, which are integral with engine mounting blocks, now have increased diameters with dirty inlet oil flowing though a plurality of radially positioned, spaced ports and with filtered clean oil flowing axially through a neutral outlet port. Increased diameter filter mounting bases require threaded nutplates of increased diameter which has resulted in modified filter configurations. In addition, it has been found that imparting a cyclonic rotation to dirty inlet oil increases the capacity and efficiency of the annular filter media used in the spin-on filters.

In that spin-on filter elements are designed to be replaced at specified intervals, it is worthwhile to design these filters to reduce the expense of their manufacturer while maintaining their reliability. Expense and reliability are of considerable importance with filters that may be used with diesel engines because it is necessary to change these filters at shorter intervals than filters used for gasoline engines.

SUMMARY OF THE INVENTION

In view of the aforementioned considerations, the present invention is directed to a filter assembly for filtering a fluid, wherein the filter assembly comprises a cylindrical housing having an annular wall defining a cylindrical space, a closed end and an open end. An end plate assembly partially closes the open end and provides a port for receiving a portion of a filter mounting base. At least the first annular filter element is disposed in the housing and supported in the end plate assembly. A spacer element is disposed between the end plate assembly and the filter element wherein the spacer element comprises a disk having a central opening therethrough for receiving the standpipe of the filter mounting base and an axially extending peripheral flange having an array of projecting radial fins which are axially canted thereon for imparting a cyclonic motion to the fluid being filtered. A plurality of axially extending legs engage the end plate arrangement in order to keep the filter element in spaced relation thereto, whereby the fluid flows between the legs, over the fins, through the filter element and out of the standpipe received in the opening through the disk.

In a preferred embodiment of the invention, the spacer element is unitary with an end cap used to close one end of an filter media used in the filter element. In this preferred embodiment, the aforedescribed spacer element becomes part of the filter element since it comprises one of the end caps of the filter element.

The present invention is also directed to end cap for used with an annular filter media to form a filter element for mounting in a cylindrical housing to provide a filter element for filtering a fluid, wherein the housing is closed by an end plate assembly. The end cap comprises a disk having a central opening therethrough for receiving a standpipe, the disk closing an end of the filter media. An axially extending peripheral flange is on the disk, the axially extending peripheral flange having an array of radially projecting fins which are axially canted thereon for imparting a spiral motion to the fluid being filtered. The axially extending peripheral flange cooperates with the disk to provide a pocket for receiving the end of the annular filter media. A plurality of axially extending legs engage the end plate assembly in order to keep the filter element in spaced relation thereto, whereby the fluid flows between the legs, over the fins, through the filter media and out of the standpipe received in the opening through the disk.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION

Figure 2:
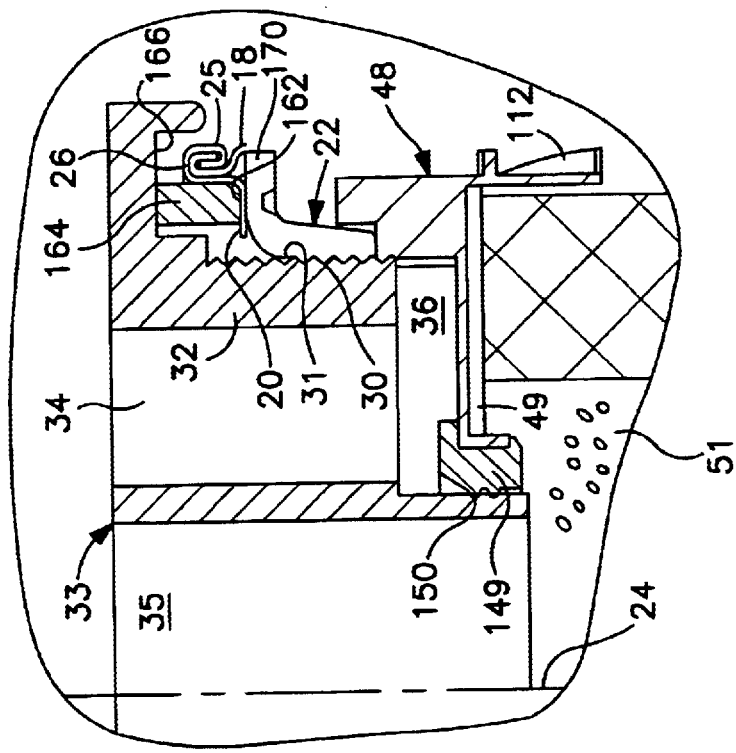
FIG. 2 is an enlarged elevation of a portion of FIG. 1.
Figure 1:
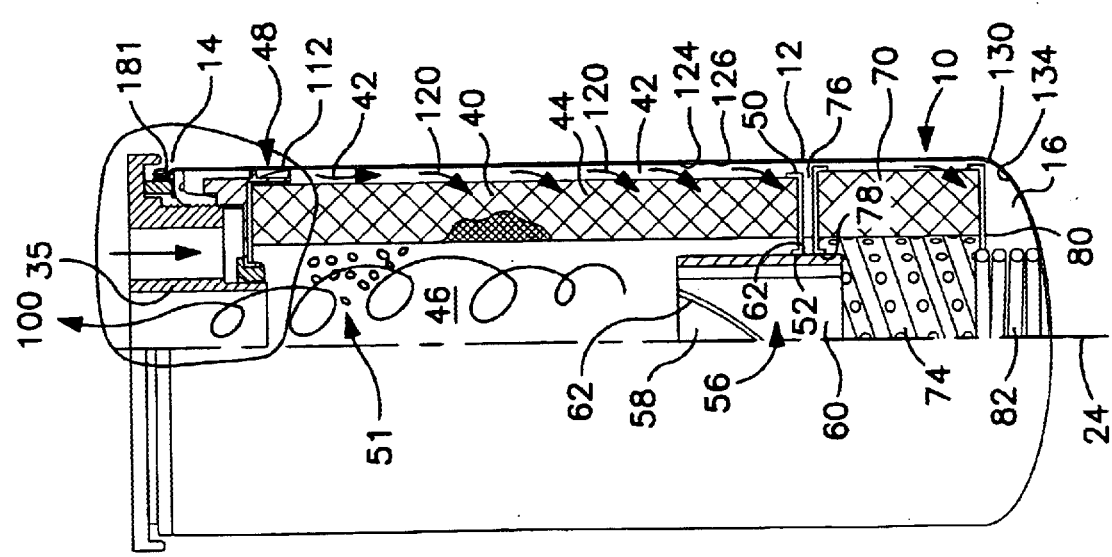
FIG. 1 is a side view, partially in elevation, of a filter configured in accordance with the principals of the present invention.
Figure 3:
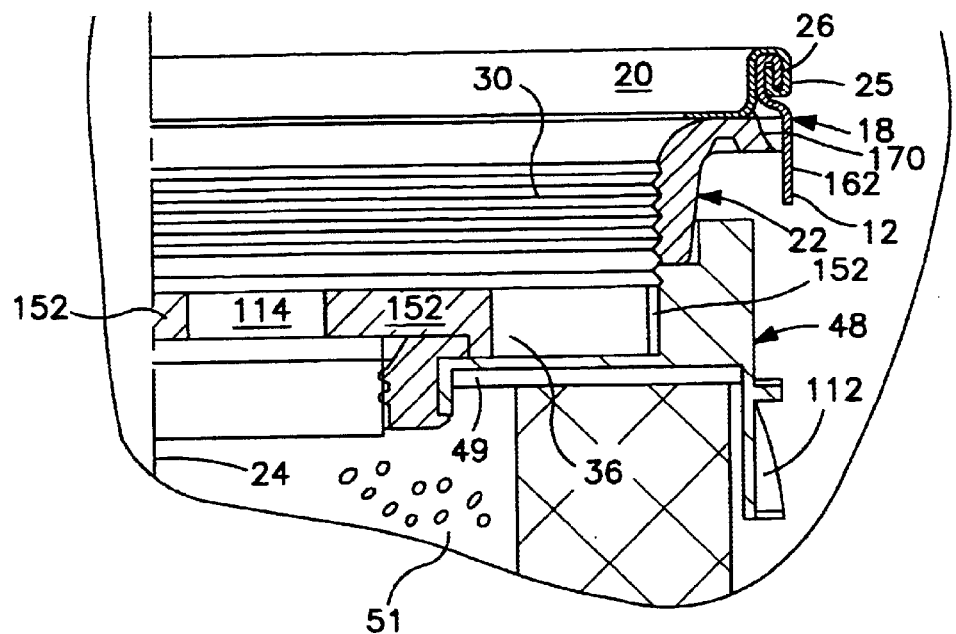
FIG. 3 is a view similar to FIG. 2, but not including a filter mounting base and standpipe.

Referring now to FIGS. 1–3, there is shown a filter cartridge 10, configured in accordance with the principles of the present invention, wherein the filter cartridge 10 includes a canister housing 12 having a first end 14 and a second end 16 which is domed. The first end 14 includes an end plate assembly 18 which includes an endplate 20 welded to a nutplate 22 and is coaxial with an axis 24 of the filter canister. The end plate assembly 18 is retained at the first end 14 of the housing 12 and within the canister by a peripheral portion 25 of the end plate 20 which is enfolded with an end portion 26 of the housing 20. Preferably, the filter cartridge 10 is mounted with the axis 24 extending at least generally vertically and the first end 14 of the housing being the top end and second end 16 of the housing being the bottom end.

The canister 12 is configured in accordance with a preferred embodiment of the invention as a filter canister for filtering lubricating oil used in internal combustion engines. The nutplate 22 has internal threads 30 which are threaded onto threads 31 of a threaded stud 32 of a filter mounting base 33 projecting from an engine (not shown), through which dirty unfiltered oil enters the filter cartridge 10 through a plurality of radially spaced openings 34 in the filter mounting base 33 and clean filtered oil returns to the engine through a central standpipe 35. The plurality of radially spaced inlet openings 34 are isolated from the standpipe 35 and allow lubricating oil to flow into an annular space 36 which is defined by a filter element spacer 37, according to the presnt invention, that abuts the nutplate 22 and surrounds the threaded stud 32 which has the thread 31 on the outer surface thereof.

Urged against the spacer 37 is a first filter element 40 which is a full flow filter element. The first filter element 40 has a diameter less than the diameter of the housing 12 so that an annular inlet channel 42 is created between the filter element 40 and the inner surface of the wall of the canister housing 12. The first filter element 40 is comprised of an annular small particle filter media 44 having a first hollow core 46 therein and having first and second ends. The first end is closed by the spacer 37 which is also a first end cap 48 and the second end is closed by a second end cap 50. The spacer 37 is bonded by a layer 49 of plastisol or other adhesive to become the first end cap 48 integral with the filter media 44 to thus form the filter element 40 which includes the second end cap 50 and a perforated center tube 51. The first end cap 48 (comprised of the spacer 37) is urged against the nutplate 22, while the second end cap 50 is annular defining a hole 52 therethrough, which hole receives a first flow-altering element 56 disposed internally with respect to the filter elements 40 and 70. The first flow deflecting element 56 has a first end 58 that projects into the first hollow core 46 and a second end 60 which projects below the first filter element 40 to impart a non-axial component to clean fluid flowing out of the second filter element 70. The flow deflecting element 56 has a radially projecting flange 62 which abuts the flange 50 so as to be sandwiched between the first filter element 40 and a second filter element 70.

The second filter element 70 which is stacked with the first filter element 40 and has a portion of the annular inlet channel 42 therearound. The second filter element 70 has an annular sludge removing filter media 72 which defines therein a second hollow core 74, which second hollow core 74 communicates with the first hollow core 46 through the flow-altering element 56. The second filter element 70 has a first end closed by a first annular end cap 76 which has an opening 78 therethrough which receives the second end 60 of the flow-altering element 56 and abuts the bottom surface of the radial flange 62 so as to clamp the flow-altering element in place with the second end 60 of the flow-altering element received within the hollow core 74 of the first annular filter media 72. At the second end of the sludge removing filter media 72 is a second end cap 80 which is configured as a closed disk without a center opening. The second end cap 80 is engaged by a coil spring 82 which abuts the closed second end 16 of the canister 12 to urge the second filter element 70 against the radial flange 62 of the flow-deflecting element 56 that in turn abuts the first filter element 40 and holds the first filter element against the nutplate 22.

Dirty lubricating oil 85 flowing in the annular inlet channel 42 and which does not flow radially through the first filter media 44, flows radially through the second filter media 72 and then through the first flow-deflecting element 56.

Further details of the flow-altering element 56 are set forth in U.S. patent application Ser. No. 09/398,459 filed on Sep. 17, 1999 now U.S. Pat. No. 6,423,225 and incorporated herein in its entirety by reference.

The aforedescribed arrangement is especially useful with lubricating oil filters wherein the first filter element 40 is a full flow filter element and the second filter element 72 is a bypass filter element. It has been found desirable to mix the lubricating oil which has been filtered by the bypass filter element 72 with the filter oil filtered by the full flow filter element 40 before returning the oil to the engine in the flow stream 100 passing through the central standpipe 35. This arrangement is especially useful when the second filter element 72 which forms the bypass element is arranged for recycling sludge generated by the internal combustion engine while the full flow filter element 40 traps only particles or dirt. Consequently, as the oil stream undergoes many passes through the filter cartridge 10, the first filter element 40 traps primarily dirt or particulate matter in the filter media 44, while the second filter element 70 traps primarily sludge in the second filter media 72. Thus, the first filter media 44 has an increased dirt-holding capacity because it does not also trap sludge, thereby rendering the entire filtering system provided within the cartridge 10 with an increased capacity and efficiency that improves lubricating oil filtration and substantially increases intervals between oil filter changes.

Figure 4:
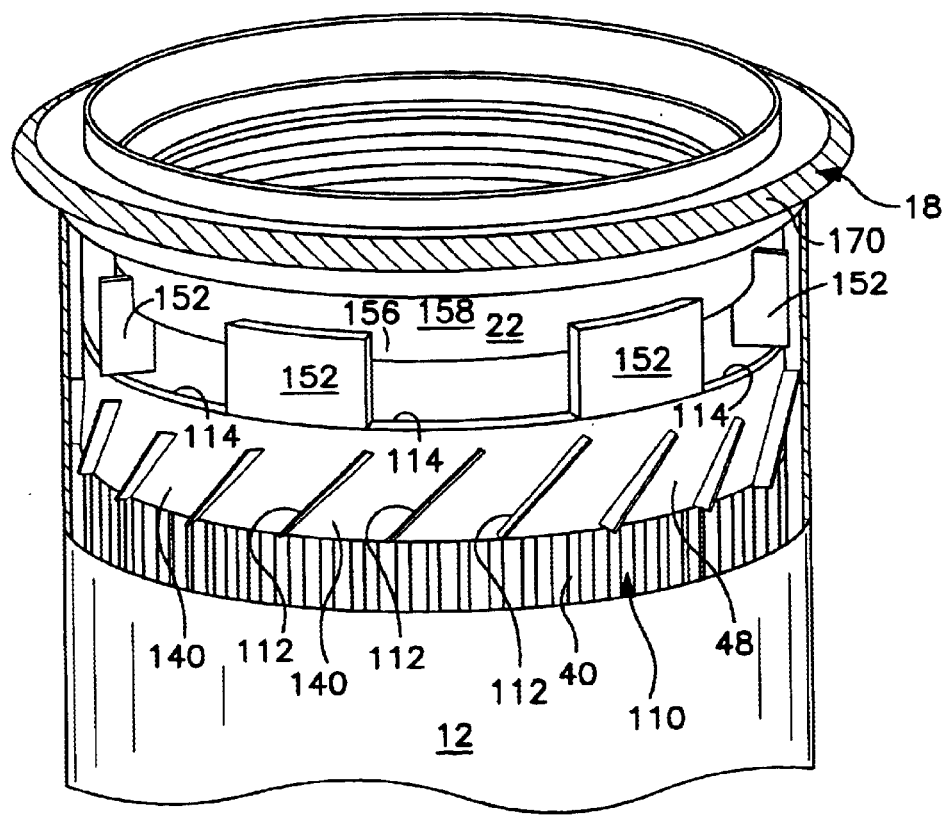
FIG. 4 is a side perspective view with portions of the filter housing deleted showing a spacer configured in accordance with the principals of the present invention supporting the filter element on a nutplate, in accordance with the principles of the present invention.
Figure 5:
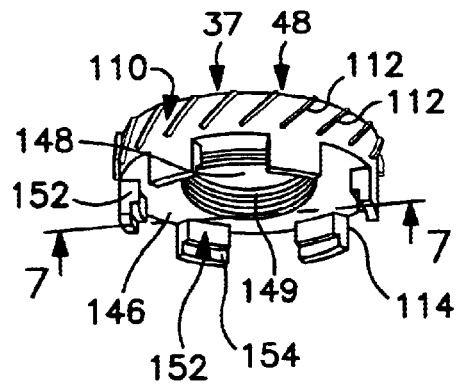
FIG. 5 is a perspective view of a spacer configured in accordance with the principles of the present invention.
Figure 6:
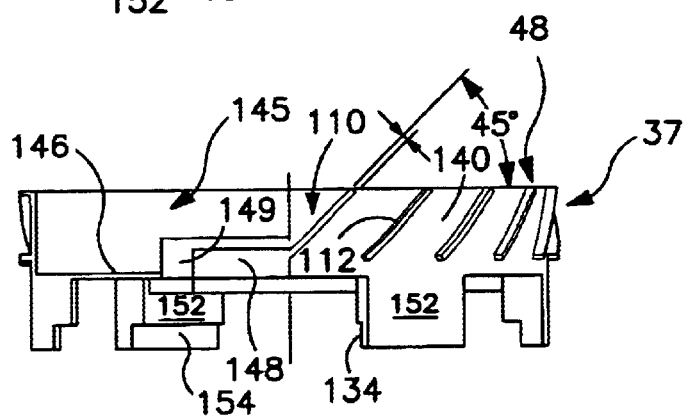
FIG. 6 is a side view partially in elevation of the spacer of FIG. 5.
Figure 7:
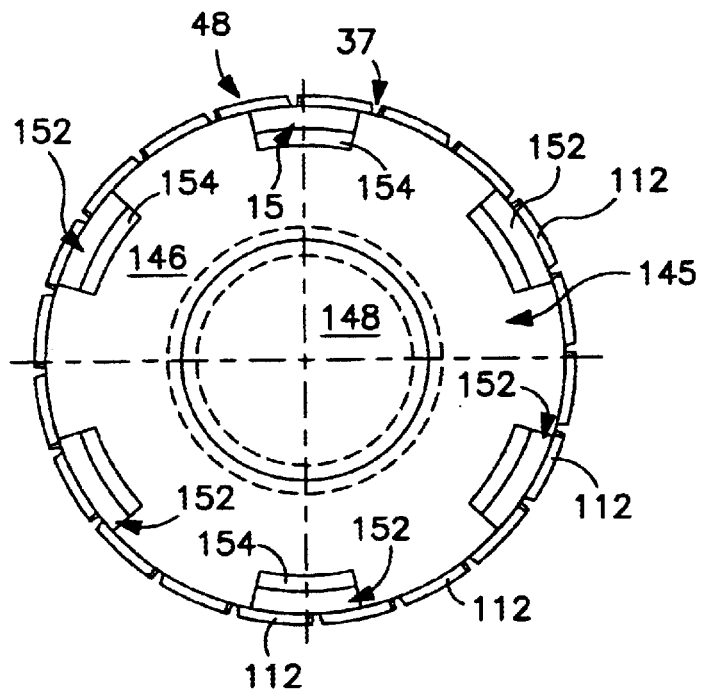
FIG. 7 is an end view of the spacer of FIG. 5 taken along lines 7—7 of FIG. 5.
Figure 8:
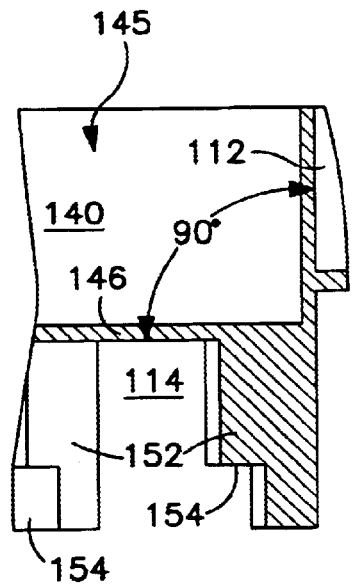
FIG. 8 is an enlarged view of a portion of the spacer of FIGS. 5–7.

Referring now to FIG. 4, it is seen that the spacer 37 is preferably a unitary structure providing the end cap 48 for the filter element 40. Preferably the spacer 37 which form end cap 48 is molded of a resinous material but it can also be made of metal. The spacer 37 has an external array 110 of fins 112 that provide a second deflector positioned in the annular inlet channel 42 just down stream of inlet openings 114 through the spacer 37 forming the first end cap 48. As is seen in FIG. 1, the array 110 of fins 112 imparts a rotational motion to the fluid prior to the fluid entering the first filter element 40 so that the fluid spirals in the direction of arrows 120 around the first filter element 40 causing relatively large particles to migrate centrifugally toward the inner surface 124 of the cylindrical wall 126 comprising the housing 12, instead of passing through the small particle filter media 44 of the first filter element 40. Accordingly, it is mostly smaller particles of dirt or contaminant that pass through the first filter element 40.

The fluid continues to spiral as it moves in the annular inlet space 42 toward the second filter element 70, keeping a substantial quantity of large particles away from the second filter element so that the second filter element mainly traps sludge in the sludge removing filter media 72. A substantial portion of the large particles remain suspended in the oil near the surface 124 of the canister wall 126 and never pass into the second filter element 70.

The large particles which have avoided filter elements 40 and 70 pass through a gap 130 between the end cap 80 of the second filter element 70 and the surface 124 of wall 126. The particles then become trapped in a chamber 134 defined by the domed second end 16 of the housing 12. The gap 130 is maintained by the spring 82 which urges the second filter element 70 against flange 62 of the flow deflecting element 56, which in turn abuts the first filter element 40 to urge the first filter element against the nutplate 22. Since the chamber 134 is beneath the second filter element 70, the heavy particles settle out and accumulate against the inner surface of the domed end 16.

As is seen in FIG. 4, the array 110 fins 112 is preferably unitary with an axially projecting peripheral flange 140, the fins being disposed at an angle of approximately 45° with respect to the axis 24 of the filter canister 10.

Referring now mainly to FIGS. 4–8, it is seen that the first end plate 48 which provides the spacer 37 provides a pocket 145 for receiving the end portion of the filtermedia 44 (FIGS. 1–4). The pocket 145 is formed by the axially projecting peripheral flange 140 and an annular disk 146 unitary with the flange. The disk 146 has a central opening 148 therethrough for receiving the standpipe 35 of FIGS. 1 and 2. Around the central opening 148, there is an inner seal 149 which has an axially extending radially facing sealing surface 150 for sealing between the standpipe 32 and filter element 40 so as to isolate the hollow core 46 of the filter element from the annular inlet space 36 (FIGS. 1 and 2).

The inlets 114 for dirty oil are spaces between legs 152 projecting axially form the axially projecting flange 140. Each leg 152 has an inwardly facing notch 154 for receiving the edge portion 156 of a lip 158 extending axially from the nutplate 22 (see FIG. 4).

Figure 9:
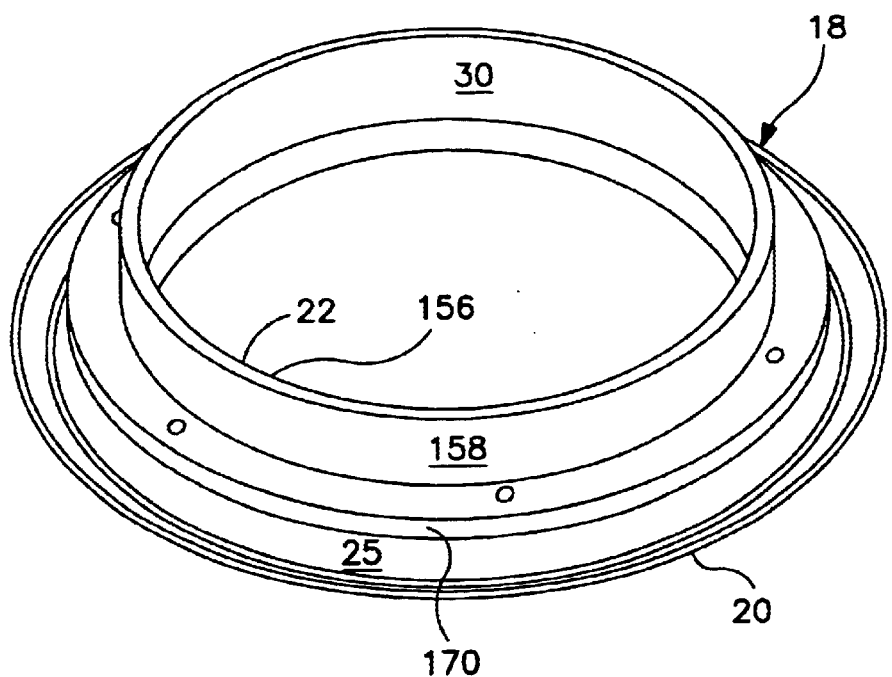
FIG. 9 is a top perspective view of an end plate assembly according to the present invention.
Figure 10:
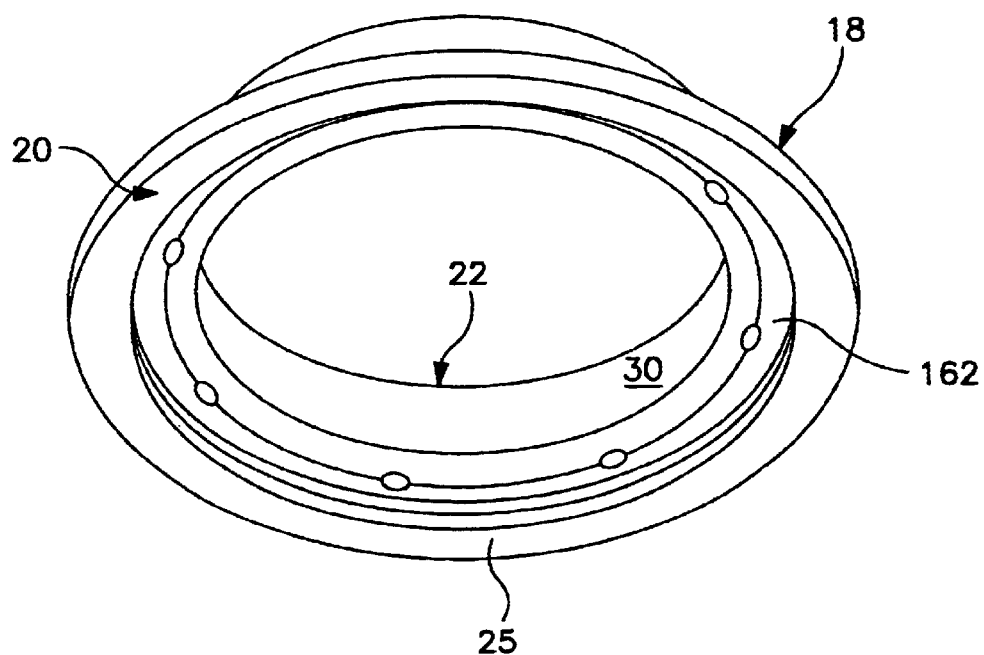
FIG. 10 is a bottom perspective view of the end plate of FIG. 9.

As is best seen in FIGS. 9 and 10, the end plate assembly 18 has two components, the end plate 20 and the nutplate 22 which are spot welded to one another to form an integral unit. The end plate 20 has a groove 162 therein for receiving a gasket 164 which seals with a land 166 on the filter mounting base 33 (see FIG. 1) and is bendable so that the peripheral portion 25 thereof is bent into a J-shape enfolded with the end portion 26 of the housing 12 to permanently join the housing and the end plate 20 together. The nutplate 22 has a radially extending portion 170 which is welded to the end plate 20 to provide the end plate assembly 18 as well as the lip 158 formed by an axially extending portion having the internal threads 30 thereon for threading onto the externally threaded stud 32 of the filter mounting base 33 (see FIGS. 1 and 2). The axially extending lip 158 is directly engaged by the notches 154 in the legs 152 extending from the first end cap 48 which forms the spacer 37.

From the foregoing description, one skilled in the art can easily ascertain the essential characteristics of this invention and, without departing from the spirit and scope thereof, can make various changes and modifications of the invention to adapt it to various usages and conditions.

We claim:

1. A spacer element for use with a filter having a cylindrical canister in which is disposed a filter element having an annular filter media for filtering a fluid, wherein the canister is closed by an end plate arrangement, the spacer element comprising:

a disk having a central opening therethrough for receiving a stand pipe of a filter mounting base;

an imperforate, annular, peripheral flange axially extending from a first side of the disk and having an array of radially projecting fins formed on an outer surface of the flange and which said fins are axially canted thereon and configured to impart a spiral motion to the fluid prior to the fluid being filtered, and a plurality of legs defining axially extending spaces therebetween, the legs extending axially from a second side of the disk and engaging the end plate arrangement in order to keep the filter element in spaced relation thereto, whereby the fluid flows through the spaces between the legs, over the fins, through the filter element and out of the stand pipe received in the opening through the disk.

2. The spacer element of claim 1 wherein the axially extending peripheral flange defines a cylindrical space for receiving the filter media of the filter element.

3. A filter element including the spacer element of claim 2 wherein the spacer element encloses the end of the annular filter media with the disk closing the end of the filter media wherein the spacer element functions as an end cap.

4. The spacer element of claim 1 wherein the spacer element includes an annular seal disposed at the central opening of the disk for sealing with the stand pipe.

5. The spacer element of claim 4 wherein the annular seal has a radially facing sealing surface for sealing with the standpipe.

6. The spacer element of claim 1 wherein the spacer element is made of a resinous material.

7. An end cap for use with an annular filter media to form a filter element for mounting in a cylindrical housing to provide a filter element for filtering a fluid, wherein the canister is closed by an end plate assembly, the end cap comprising:

a disk having a central opening therethrough for receiving a stand pipe, the disk closing an end of the filter media;

an imperforate, annular, peripheral flange extending axially from a first side of the disk and having an array of radially projecting fins formed on an outer surface of the flange and which said fins are axially canted thereon and configured to impart a spiral motion to the fluid prior to the fluid being filtered, the axially extending peripheral flange cooperating with the disk to provide a pocket for receiving the end of the annular filter media, and a plurality of legs defining axially extending spaces therebetween, the legs extending axially from a second side of the disk and engaging the end plate assembly in order to keep the filter element in spaced relation thereto, whereby the fluid flows through the spaces between the spaced legs, over the fins, through the filter media and out of the stand pipe received in the opening through the disk.

8. The end cap of claim 7 wherein the end cap includes an annular seal disposed at the central opening of the disk for sealing with the stand pipe.

9. The end cap can of claim 8 wherein the annular seal has a radially facing sealing surface for sealing with the stand pipe.

10. The end cap of claim 7 wherein the end cap is made of a resinous material.

11. The filter assembly of claim 10 wherein the end plate assembly comprises a nutplate and an end plate welded to the nutplate, the end plate being attached directly to the housing and the nutplate having threads for threading onto the filter mounting base and being engaged by the legs of the spacer.

12. A filter assembly for filtering a liquid, the filter assembly comprising:

a cylindrical filter media;

a cylindrical housing having an annular wall defining a cylindrical space, a closed end and an open end;

an end plate assembly for partially closing the open end and for defining an opening for receiving a portion of a filter mounting base;

at least a first annular filter element disposed in the housing and supported by the end plate assembly, the first annular filter element having an end cap comprising:

a disk having a central opening therethrough for receiving a stand pipe of a filter mounting base;

an imperforate, annular, peripheral flange extending axially from a first side of the disk and having an array of radially projecting fins formed on an outer surface of the flange and which said fins are axially canted thereon and configured to impart a spiral motion to the liquid being filtered, the axially extending peripheral flange defining a pocket for receiving the cylindrical filter media, and a plurality of legs defining axially extending spaces therebetween, the legs extending axially from a second side of the disk and engaging the end plate arrangement in order to keep the filter element in spaced relation thereto, whereby the liquid flows through the spaces between the legs, over the fins, through the filter element and out of the stand pipe received in the opening through the disk.

13. The filter assembly of claim 12 further including a second filter element within the housing axially aligned with the first filter element, the first and second filter elements having hollow cores coupled by a spiral flow inducing element.

14. The filter assembly of claim 12 further including a sealing element disposed in the central opening of the disk for the sealing with the standpipe of the filter mounting base.

15. The filter assembly of claim 14 wherein the sealing element has a radially facing sealing surface for sealing with the standpipe.

* * * * *